(12) United States Patent
Herrmann et al.

(10) Patent No.: US 9,981,526 B2
(45) Date of Patent: May 29, 2018

(54) CLIMATE CONTROL SYSTEM AND METHOD FOR AIR TEMPERING

(71) Applicant: MAHLE International GmbH, Stuttgart (DE)

(72) Inventors: Michael Herrmann, Stuttgart (DE); Holger Laux, Dietingen (DE); Varsamis Venetidis, Ludwigsburg (DE); Michael Sickelmann, Kornwestheim (DE); Ronny Schlieder, Fellbach (DE)

(73) Assignee: MAHLE International GmbH, Stuttgart (DE)

( * ) Notice: Subject to any disclaimer, the term of this patent is extended or adjusted under 35 U.S.C. 154(b) by 291 days.

(21) Appl. No.: 14/723,890

(22) Filed: May 28, 2015

(65) Prior Publication Data

US 2015/0343879 A1    Dec. 3, 2015

(30) Foreign Application Priority Data

May 28, 2014 (DE) .................. 10 2014 210 264

(51) Int. Cl.
*B60H 1/00* (2006.01)

(52) U.S. Cl.
CPC ..... *B60H 1/00064* (2013.01); *B60H 1/00542* (2013.01); *B60H 1/00557* (2013.01); *B60H 1/00857* (2013.01)

(58) Field of Classification Search
CPC ........... B60H 1/00064; B60H 1/00542; B60H 1/00557; B60H 1/00857

USPC ........................................ 165/203
See application file for complete search history.

(56) References Cited

U.S. PATENT DOCUMENTS

| | | | | |
|---|---|---|---|---|
| 4,383,642 A | * | 5/1983 | Sumikawa | B60H 1/00064 165/42 |
| 6,079,484 A | * | 6/2000 | Uemura | B60H 1/00064 165/202 |
| 6,772,833 B2 | | 8/2004 | Auer et al. | |
| 6,786,278 B2 | * | 9/2004 | Ku | B60H 1/0005 165/202 |

(Continued)

FOREIGN PATENT DOCUMENTS

| | | |
|---|---|---|
| DE | 103 34 500 A1 | 2/2004 |
| DE | 10 2004 033 402 B4 | 6/2007 |

(Continued)

*Primary Examiner* — Raheena R Malik
(74) *Attorney, Agent, or Firm* — Muncy, Geissler, Olds & Lowe, P.C.

(57) ABSTRACT

A climate control system for a vehicle interior, having a housing, a cooling device, and a heating device. At least one first flow channel, a second flow channel, and a third flow channel are disposed in the housing. A mixing chamber is disposed within the housing, which has at least one outflow opening, which is downstream of the mixing chamber in the flow direction. The flow channels are closable by a flap element, a third flow channel leads from the cooling device to the outflow opening while bypassing the mixing chamber, the flap element in the first flow channel and the flap element in the second flow channel are kinematically coupled and can be adjusted by a mutual control device. The flap element in the third flow channel is kinematically coupled to the other two flap elements or can be adjusted independently by a further control device.

13 Claims, 3 Drawing Sheets

(56) References Cited

U.S. PATENT DOCUMENTS

| | | | | |
|---|---|---|---|---|
| 7,281,574 | B2* | 10/2007 | Shibata | B60H 1/00064 165/203 |
| 7,478,670 | B2 | 1/2009 | Richter et al. | |
| 7,766,078 | B2* | 8/2010 | Kim | B60H 1/00685 165/100 |
| 8,382,563 | B2* | 2/2013 | Sievers | B60H 1/00007 454/126 |
| 2005/0118944 | A1* | 6/2005 | Vincent | B60H 1/00064 454/121 |
| 2005/0263277 | A1* | 12/2005 | Kim | B60H 1/00071 165/203 |
| 2007/0204985 | A1* | 9/2007 | Fukagawa | B60H 1/00685 165/203 |
| 2008/0223546 | A1* | 9/2008 | Lee | B60H 1/00064 165/43 |
| 2011/0114283 | A1* | 5/2011 | Mattiello | B60H 1/00857 165/42 |

FOREIGN PATENT DOCUMENTS

| | | |
|---|---|---|
| DE | 10 2007 014 706 A1 | 9/2008 |
| DE | 10 2012 006 323 A1 | 11/2012 |
| FR | 2 789 629 A1 | 8/2000 |
| FR | 2 920 110 A1 | 2/2009 |

\* cited by examiner

CLIMATE CONTROL SYSTEM AND METHOD FOR AIR TEMPERING

This nonprovisional application claims priority under 35 U.S.C. § 119(a) to German Patent Application No. 10 2014 210 264.2, which was filed in Germany on May 28, 2014, and which is herein incorporated by reference.

BACKGROUND OF THE INVENTION

Field of the Invention

The present invention relates to a climate control system for a vehicle interior, with a housing, a cooling device, and a heating device.

Description of the Background Art

Climate control systems are used for conditioning the air in vehicle interiors. It is routinely possible to regulate both the amount of air blown into the interior and the temperature of the blown-in air by these systems. Numerous devices, which enable ventilation, heating, or air conditioning, are known for this purpose from the prior art.

Simple designs of a climate control system envisage providing only one temperature zone, so that there is the same or at least approximately the same temperature in the entire vehicle interior or the vehicle interior is supplied with air that cannot be regulated separately for the different interior areas, however. Only one desired temperature for the entire interior can be specified by the vehicle occupants. Higher-quality climate control systems also offer the possibility of ventilating and tempering a number of zones individually.

In distributor housings of climate control systems, depending on the number of climate-controlled zones, a different number of flow channels and flap elements is provided for this purpose, which allow individual adjustment of the air amount and temperature for the individual zones. The air in this case is released into the interior over different outflow openings, assigned to the particular zones.

DE 103 34 500 A1, which corresponds to U.S. Pat. No. 6,772,833, discloses a heating, ventilation, and air conditioning system for the independent supplying of four zones within a vehicle interior. The housing of the climate control system has four outlets for this purpose, whereby each of the tempered zones is assigned an outlet. The system has an evaporator that can be used for cooling the air and a heater core that can be used for heating the air.

DE 10 2004 033 402 B4, which corresponds to U.S. Pat. No. 7,478,670, discloses a modular system for constructing a 1-to-4-zone climate control system for vehicles. To this end, a plurality of air distribution devices and a plurality of air tempering devices are provided, which are placed within the same housing.

A disadvantage of the prior art solutions in particular is that the distributor housings used in known climate control systems are adapted specifically to the number of zones to be tempered; this results in a great variety of variants, which is not conducive to the preferred use of interchangeable parts.

SUMMARY OF THE INVENTION

It is therefore an object of the present invention to provide a climate control system, which has a distributor housing that can be used both for a one-zone climate control system and for a multi-zone climate control system. Further, the climate control system should have a structure that is as simple as possible and can be manufactured cost-effectively.

In addition, the object of the invention is to provide a method for air tempering via the climate control system.

In an exemplary embodiment of the invention, provided is a climate control system for a vehicle interior, with a housing, with a cooling device, and with a heating device, whereby at least one first flow channel for a first cold air flow, a second flow channel for a hot air flow, and a third flow channel for a second cold air flow are disposed in the housing, whereby a mixing chamber is disposed within the housing, which can be supplied with the hot air flow and with the first cold air flow, whereby the housing has at least one outflow opening, which is downstream of the mixing chamber in the flow direction, whereby the flow channels in each case are closable by a flap element, whereby the third flow channel leads from the cooling device to the outflow opening while bypassing the mixing chamber, whereby the flap element in the first flow channel and the flap element in the second flow channel are kinematically coupled together and can be adjusted by the same control device and the flap element in the third flow channel is kinematically coupled to the other two flap elements or can be adjusted independently by a further control device.

The first flow channel can be used to guide an air flow flowing from the cooling device toward a mixing chamber. The first flow channel can be used to guide an air flow flowing from the heating device toward a mixing chamber. The third flow channel guides an air flow flowing from the cooling device past the mixing chamber to an outflow opening of the housing. The third flow channel represents a cold air bypass, which makes it possible to cool in addition the air flowing out of the mixing chamber to the outflow opening, in order to achieve a greatly reduced air temperature at the outflow opening. This is especially advantageous because consequently an especially great cooling of the air can be produced in a simple manner, as a result of which an advantageous tempering of the interior can be achieved.

The first flap element in the first flow channel and the second flap element in the second flow channel can be coupled together kinematically and thus can be adjusted interdependently. A desired temperature can be produced from the cold air flow and the hot air flow in the mixing chamber by a dependent adjustment of the two flap elements The third flap element can be also kinematically coupled to the other two flap elements. The three flap elements in this case can be adjusted by a mutual control device. This is advantageous because only one control device, for example, an electric motor, is necessary for all three flap elements.

In an embodiment, the third flap element can also be adjusted via a separate, additional control device. This is especially advantageous, because an adjustment decoupled from the other two flap elements is made possible.

The flap element of the third flow channel can be kinematically coupled to the flap element of the first flow channel and to the flap element of the second flow channel, and the three flap elements can be adjusted by a mutual control device.

Such a coupling of flap elements is especially advantageous for a one-zone climate control system, which produces only one defined temperature level at the outflow opening or outflow openings. Different scenarios can be realizing depending on the kinematic systems used for coupling the flap elements, whereby the individual flap elements in the different scenarios have different opening degrees, as a result of which the flowing air can be brought to different temperature levels especially advantageously and simply.

The first flow channel and/or the second flow channel and/or the mixing chamber and/or the outflow opening and/or the third flow channel can be divided into a plurality of zones by one or more separation elements, whereby each flow subchannel of each zone can be closed by a flap element in each case.

In an embodiment, the otherwise unchanged housing can be divided into a plurality of zones by separation elements mounted in the interior. A multi-zone climate control system can be produced especially simply in this way with retention of the housing of a one-zone climate control system. This is especially advantageous, because the housing can be used as an interchangeable part for a plurality of different climate control systems. Each zone is advantageously assigned at least one first flow subchannel, a second flow subchannel, and a third flow subchannel. The flow subchannels are the areas separated from the original flow channel by the separation elements. The totality of the particular flow subchannels corresponds to the original undivided flow channel with respect to the flow cross section.

The employed flap elements can be made substantially structurally identical with the flap elements of a one-zone climate control system and be adapted only slightly to the geometry of the produced flow subchannels. This can occur advantageously, for example, by adaptation of the longitudinal extension of the particular flap elements.

Each zone has one or more outflow openings, each of which opens in a defined area of the vehicle interior and is used for tempering this area.

It can also be expedient, if the flap element of the first flow subchannel and the flap element of the second flow subchannel of a zone are kinematically coupled together and can be adjusted by a mutual control device, whereby the flap element of the third flow subchannel of a zone can be adjusted by an additional control device independently of the other flap elements.

A greater variability with respect to the tempering of the air in the individual zones can be achieved by a configuration with a third flap element decoupled kinematically from the first two flap elements. The kinematic coupling between the first flap element and the second flap element can be substantially identical to the design for a one-zone climate control system, in which all three flap elements are kinematically coupled together. This is advantageous in order to increase further the proportion of interchangeable parts between a one-zone and a multi-zone design of the climate control system.

The cross-sectional area of the first flow subchannels, the second flow subchannels, and/or the third flow subchannels, except for the cross-sectional area occupied by the separation elements, can be identical to the respective cross-sectional area of the flow channels that are not divided by separation elements.

This is especially advantageous, because the housing for a one-zone and a multi-zone design can be substantially identical. The division into a plurality of zones is achieved by separation elements inserted in the interior.

An exemplary embodiment provides that the individual positions of the flap elements can be predefined based on a control curve, which predefines the positions of the flap elements as a function of a predefinable target temperature at a specific outflow opening.

The control curve can be created advantageously by a special kinematic system, which by the use of force transfer and transmissions leads to a predefined adjustment of the individual flap elements in an interdependent manner. In this case, all kinematically connected flap elements are advantageously adjusted by the movement of a single control device according to a scheme predefined by a control curve; as a result, the released cross-sectional area of the individual flow channels is varied and different temperature levels at the outflow openings are produced. The target temperature is advantageously predefined by the desire of an occupant or a control signal from a central control unit and corresponds to an air temperature at a specific outflow opening.

The kinematic coupling between the first flap element and the second flap element or between the first flap element, the second flap element, and the third flap element can be produced by lever elements and/or joints and/or gears.

The kinematic coupling by lever elements and/or joints and/or gears such as, for example, a link gear, is advantageous in order to achieve an interaction of the individual flap elements that enables a defined temperature regulation. By adapting the kinematic coupling, an adapting of the adjustment of the flap elements in the case of an otherwise unchanged climate control system can be achieved in a simple way.

In an embodiment of the invention, it is provided in addition that in a first position of the flap elements, the first flow channel can be completely released by the first flap element, the second flow channel can be completely closed by the second flap element, and the third flow channel can be completely released by the third flap element. Such a position is particularly advantageous to achieve an especially low temperature at the specific outflow opening associated with the flow channels. Such a position of the flap elements is used in particular in the case of a high cooling demand in the vehicle interior.

In a second position of the flap elements, the first flow channel can be completely closed by the first flap element, the second flow channel can be completely released by the second flap element, and the third flow channel can be completely closed by the third flap element. Such a position is especially advantageous to achieve an especially high temperature at the respective outflow opening associated with the flow channels. Such a position of the flap elements is especially advantageous in the case of a high heating demand.

In a third position of the flap elements, the first flow channel can be partially released by the first flap element and the second flow channel can be partially released by the second flap element, and the third flow channel can be completely closed by the third flap element. Such a position of the flap elements allows the production of a mixed temperature between the cold air flow from the first flow channel and the hot air flow from the second flow channel. Depending on the temperature level to be achieved, the first flap element and the second flap element can more or less release the respective flow cross sections to achieve a predetermined air temperature in this way. This third position of the flap elements is advantageous for creating a temperature level between the extreme positions of the flap elements in the first position (exceptionally cold air) and in the second position (exceptionally hot air).

An exemplary embodiment of the invention relates to a method for air tempering by via a climate control system according to the invention, whereby the third flap element can be completely closed until the temperature falls below a defined target temperature of the air at an outflow opening, whereby the third flap element starting when the air at the outflow opening falls below the defined target temperature increasingly releases the third flow channel to the outflow opening and the third flap element completely releases the third flow channel at a defined minimum target temperature of the air at the outflow opening.

Such a method is especially advantageous, because different temperature levels at the outflow openings can be produced by the method by interdependently adjusting the individual flap elements. This is advantageous particularly in association with a kinematic coupling of the flap elements.

When the third flow channel is opened, an especially cold air temperature can be achieved with utilization of the cool air flow in the third flow channel. This is accordingly especially advantageous when there is a high cooling demand. By a continuous closing of the third flow channel and by a continuous closing of the first flow channel and a simultaneous continuous opening of the second flow channel, the air temperature at the respective outflow opening can be successively increased until the maximum temperature is achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
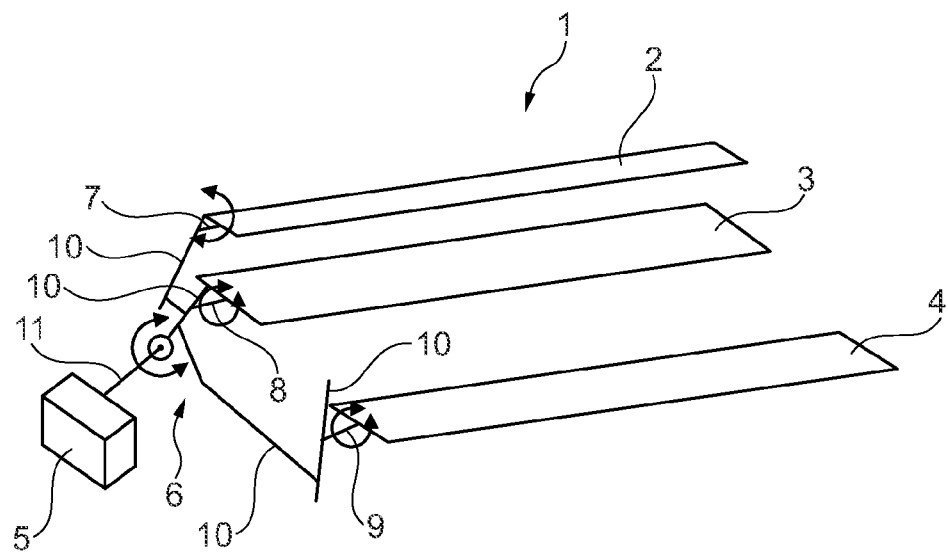
FIG. 1 shows a schematic view of three flap elements, as they are used in the three flow channels, whereby all three flap elements are connected to one another by kinematic coupling and can be adjusted by a mutual control device.

FIG. 1 shows a schematic view of a flap arrangement 1 for a one-zone climate control system. Flap arrangement 1 has a first flap element 2, which can be used for opening a cold air bypass or for closing this cold air bypass. Flap element 3 is used for opening or for closing a flow channel for cold air. Flap element 4 is used for opening or for closing a flow channel for hot air.

In the exemplary embodiment of FIG. 1, all three flap elements 2 to 4 are connected together via a mutual kinematic system 6. Kinematic system 6 is formed by a plurality of lever elements 10, which in FIG. 1 schematically represent the connection of the individual flap elements 2 to 4.

Flap element 2 is rotatable about rotation axis 7, flap element 3 is rotatable about rotation axis 8, and flap element 4 is rotatable about rotation axis 9. The individual flap elements 2 to 4 can be rotated about their respective rotation axes 7 to 9 via a control device 5, which is connected via a drive axle 11 to kinematic system 6.

Each of the individual flap elements 2 to 4 can also be rotated about different angles by a suitable design of kinematic system 6 and lever elements 10. For this purpose, joints and gears, which correspondingly transmit the angle of twist predefined by control device 5, such as, for example, link gears, can be provided in particular on lever elements 10.

In the exemplary embodiment of FIG. 1, all three flap elements 2 to 4 can be adjusted by a control device 5 and thus interdependently connected via kinematic system 6.

Figure 2:
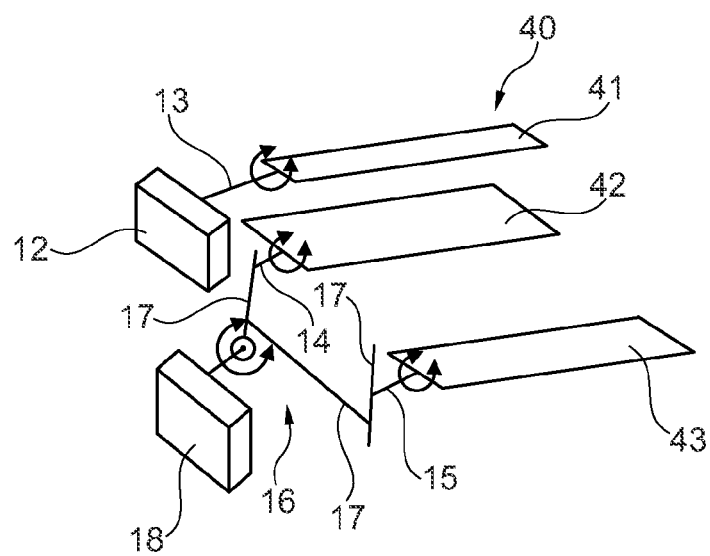
FIG. 2 shows a schematic view of three flap elements, whereby only two of the three flap elements are kinematically coupled to one another and can be adjusted via a mutual control device, whereas the third flap element can be adjusted by an additional control device independently of the other flap elements.

FIG. 2 shows a perspective view of a flap arrangement 40, which has three flap elements 41, 42, and 43 and lever elements 17. Flap elements 41 to 43 are constructed substantially identical to flap elements 1 to 4 of FIG. 1. Because flap arrangement 40 is intended for a multi-zone climate control system, the extension of flap elements 41 to 43 in width is shorter than that of flap elements 2 to 4 in FIG. 1. This is due to the fact that the flow channels for the different zones in the climate control system, with the same width for the housing, are disposed lying next to one another, as a result of which the width of each individual zone is smaller.

Flap element 41 can be rotated about rotation axis 13 and is moved by its own control device 12. The movement of flap element 41 is therefore independent of the movement of flap elements 42 and 43.

The two flap elements 42 and 43 are coupled to one another via a kinematic system 16 and can be rotated via a control device 18.

Flap element 42 can be rotated about rotation axis 13, which in the present case also represents the drive axle of control device 12. Flap element 42 can be rotated about rotation axis 14 and flap element 43 about rotation axis 15. Similar to the embodiment for FIG. 1, in particular kinematic system 16 can be designed in various ways, so that a variable coupling of the two flap elements 42 and 43 is possible. For this purpose, different lever elements, joints, or gears in particular can be provided.

The flap elements and the employed kinematic systems in the exemplary embodiments of FIGS. 1 and 2 can be partially similar in construction, so that a large portion of interchangeable parts can be used for different variants of a climate control system.

Actuators that produce a rotational movement are suitable as control device 5, 12, and 18. These include, for example, electric motors, as they are already used diversely in climate control systems. Flap elements 2 to 4 and 41 to 43 in FIGS. 1 and 2 are formed by flap elements known in a variety of ways in the prior art.

Figure 3:
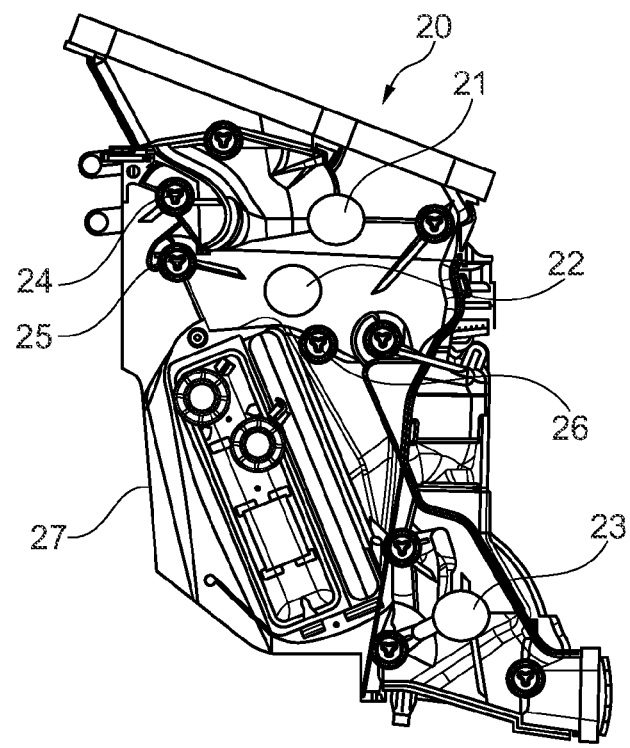
FIG. 3 shows a sectional view through a housing of a climate control system, whereby the three flap elements in particular are illustrated in the interior.

FIG. 3 shows a sectional view through a climate control system 20. A plurality of housing sections are shown in climate control system 20, which is formed substantially by housing 27. The so-called defrost housing section is designated with the reference character 21; it has an air outlet opening which can be directed directly onto the panes of the motor vehicle in order to enable defrosting of the panes. Furthermore, the main distributor housing section is designated with the reference character 22, which can have the outflow opening for the dashboard. A rear distributor housing section is designated with the reference character 23, which has at least one outflow opening for the back area of the vehicle interior.

Furthermore, the flap element for cold air bypass 24, the flap element for cold air 25, and the flap element for hot air 26 are disposed in housing 27. The individual flap elements 24, 25, and 26 are each kinematically coupled together according to the embodiment of climate control system 20 in analogy to the principles in FIGS. 1 and 2.

Furthermore, an evaporator and a heating core, which are used respectively for cooling or heating one air flow or a plurality of air flows flowing through housing 27 of climate control system 20, are arranged in climate control system 20.

In particular, the arrangement of the individual elements within housing 27 of climate control system 20 in FIG. 3 is exemplary and can be varied beyond what is shown in FIG. 3 within the scope of solutions, routinely used in the prior art for climate control systems and the arrangement of the main components within the climate control systems.

In particular, the section of housing 27, which forms rear distributor housing section 23, can be omitted in a one-zone climate control system, because then no separate air tempering occurs for the rear area of the vehicle interior. The rest of housing 27 is preferably identical for both one-zone climate control systems and multi-zone climate control systems and, for separation into a plurality of zones, is divided in the interior by separation elements. The housing can therefore be used as an interchangeable part, as a result of which the manufacturing costs due to higher quantities can be reduced. In a one-zone climate control system a flap arrangement 1 according to FIG. 1 is preferably integrated into housing 27, whereas in a multi-zone climate control system a plurality of flap arrangements 40 according to FIG. 2 are used. In this regard, a flap arrangement 40 is preferably used per zone within the climate control system.

Figure 4:
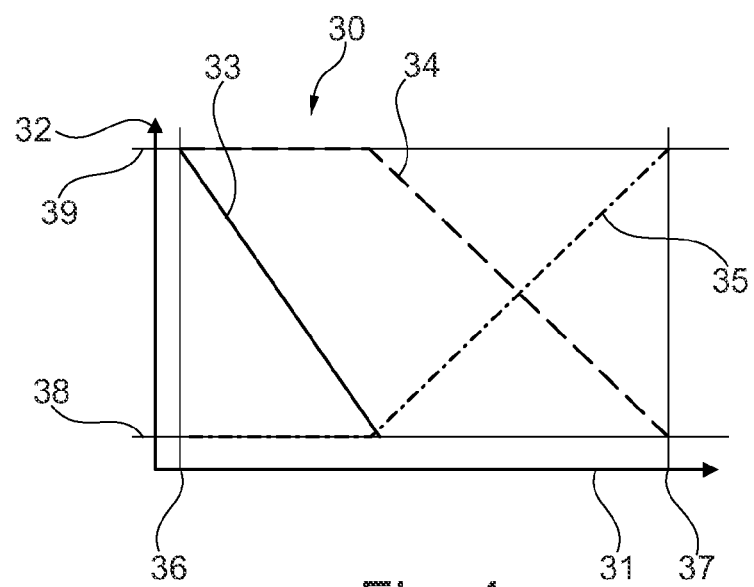
FIG. 4 shows a diagram, which represents the opening and closing of the three flap elements as a function of a temperature level to be achieved.

FIG. 4 shows a diagram 30, which illustrates in particular how the individual flap elements of a flap arrangement can be adjusted interdependently in order to produce a defined temperature at an outflow opening.

In diagram 30, the x-axis is labeled with reference character 31, which indicates a predefinable target temperature at a specific outflow opening or in a specific housing area, whereby a minimum cold target temperature is designated by point 36 and a maximum hot target temperature by point 37.

Furthermore, diagram 30 has the y-axis 32 on which the opening degrees of the individual flap elements are plotted. In this case, point 38 designates the particular adjusted position of the flap elements in which the associated flow channel is closed, and point 39 an adjusted position of the particular flap elements in which the respectively associated flow channel is completely open.

The specific position of the flap elements for the cold air bypass is designated with the reference character 33. The specific position of the flap element of the flow channel for cold air is labeled with the reference character 34 and the position of the flap element for the flow channel for hot air is labeled with the reference character 35.

For the case that an especially cold target temperature is predefined, the flap element for cold air bypass 33 and the flap element for cold air 34 are completely open. In contrast, the flap element for hot air 35 is completely closed. With such a setting, only cold air flows through the climate control system to the respective outflow opening. Because of the additionally open cold air bypass 33, the amount of cold air is increased overall, as a result of which a greater cooling effect can be achieved. A larger flow cross-sectional area is available overall because of opened cold air bypass 33 and the fully opened flap element for cold air 34, as a result of which better flow properties can be achieved with respect to acoustics as well.

In another extreme case, which is shown on the right in diagram 30, both flap element 33 for the cold air bypass and flap element 34 for the cold air are completely closed. In contrast, the flap element for hot air 35 is completely open, so that only hot air flows at the particular outflow opening.

According to the control curve predefined by diagram 30, proceeding from an especially cold target temperature the flap element for cold air bypass 33 is steadily closed with a rising specified target temperature, whereas the flap element for cold air 34 and the flap element for hot air 35 remain completely open or closed, respectively. At a time when the flap element for cold air bypass 33 is completely closed, the flap element for hot air 35 is then opened continuously and the flap element for cold air 34 is closed simultaneously. At a point formed by the intersection of the two lines 34 and 35, the flap elements for cold air 34 and hot air 35 are opened equally wide. Over the further course toward a higher target temperature, the flap element for hot air 35 is opened further, whereas the flap element for cold air 34 is closed further.

Linear courses for the opening or closing of the individual flap elements are shown in the diagram in FIG. 4. In alternative embodiments, nonlinear courses can also be provided, as a result of which a different opening relationship of the individual flow channels to one another can be achieved. In alternative embodiments, courses can also be provided in which the individual flap elements stay in a predefined position before a further adjustment is called for. To this end, in particular the control devices or the kinematic systems between the individual flap elements are to be appropriately adapted in order to achieve a further decoupling or coupling of the adjusting of the individual flap elements.

Overall, diagram 30 shows a suitable position for the individual flap elements in order to achieve the target temperature for each possible predefinable target temperature at an outflow opening.

Figure 5:
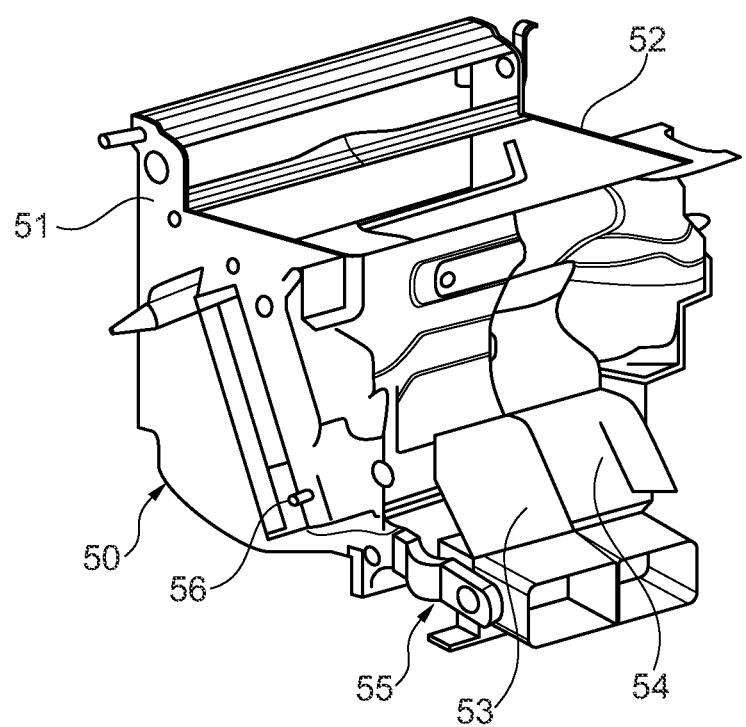
FIG. 5 shows a perspective view of a housing of a climate control system, whereby in particular the area of the housing is indicated that can be used as an interchangeable part for a one-zone and a multi-zone climate control system, as well as an area, connected to the housing in addition for a multi-zone climate control system, to enable the supplying of one or more additional zones.

FIG. 5 shows a perspective view of a housing 50 of a climate control system. Housing 50 corresponds to housing 27 shown in FIG. 3. Housing 50 can be used with an identical construction for both a one-zone climate control system and a multi-zone climate control system.

For use for a one-zone climate control system, the flow channels for hot air, for cold air, and for the cold air bypass extend over the entire width of housing 50. For a multi-zone use, housing 50 is divided in the interior in width by separation elements (not shown), so that in each case two or more flow subchannels, arranged next to one another, arise within the cross-sectional area of flow channels that are not divided in the one-zone design. Advantageously, a division is made into two adjacent zones in particular. In FIG. 5, the possible zones are labeled with the reference characters 51 and 52.

On the front bottom end region, furthermore, a rear distributor housing section 55 is shown, which is also divided into a zone 53 and a zone 54. An interior separator can also be used for this purpose. Rear distributor housing section 55 is used to supply air to the rear region of the vehicle interior. Rear distributor housing section 55 can be in fluid communication either with the mixing chambers and flow channels in housing 50 or have its own flow channels for connection to the cooling device and the heating device.

Rear distributor housing section 55 is optional and is provided only in a multi-zone design. To this end, rear distributor housing section 55 is preferably connected from the outside to housing 50.

Housing 50 furthermore has an opening 56 through which, for example, an evaporator as the cooling device or a heating element as the heating device can be pushed into housing 50.

The embodiments shown in FIGS. 1, 2, 3, and 5 for the individual flap elements or the housing of the climate control system are exemplary. Likewise, the shown kinematic systems for coupling the individual flap elements are exemplary and are not limiting in nature. In particular, other arrangements and embodiments of the individual elements beyond those shown in FIGS. 1, 2, 3, and 5 are possible, which furthermore fall within the scope of the inventive concept. An exemplary diagram is also shown in FIG. 4, which represents a possible and advantageous adjustment of the three flap elements. Variations herefrom are always possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A climate control system for a vehicle interior, the system comprising:
   a housing;
   a cooling device;
   a heating device;
   at least one first flow channel for a first cold air flow, a second flow channel for a hot air flow, and a third flow channel for a second cold air flow are disposed in the housing;
   a mixing chamber disposed within the housing that is supplyable with the hot air flow and with the first cold air flow, the housing having at least one outflow opening, which is downstream of the mixing chamber in the flow direction; and
   a first flap element that closes the first flow channel, a second flap element that closes the second flow channel and a third flap element that closes the third flow channel,
   wherein the third flow channel leads from the cooling device to the outflow opening while bypassing the mixing chamber,
   wherein the first flap element in the first flow channel and the second flap element in the second flow channel are kinematically coupled together and adjustable by a mutual control device, and
   wherein the first flap element and the second flap element are positioned upstream of the mixing chamber.

2. The climate control system according to claim 1, wherein the third flap element of the third flow channel is kinematically coupled to the first flap element of the first flow channel and the second flap element of the second flow channel, and wherein the first, second and third flap elements are adjustable by the mutual control device.

3. The climate control system according to claim 1, wherein the first flow channel and/or the second flow channel and/or the mixing chamber and/or the outflow opening and/or the third flow channel are divided into a plurality of zones by one or more separation elements, and wherein each flow subchannel of each zone is closeable by one of the first, second or third flap elements.

4. The climate control system according to claim 3, wherein the first flap element of the first flow subchannel and the second flap element of the second flow subchannel of a zone are kinematically coupled together and are adjustable by a mutual control device, and wherein the third flap element of the third flow subchannel of a zone is adjustable by an additional control device independently of the first and second flap elements.

5. The climate control system according to claim 3, wherein a cross-sectional area of the first flow subchannels, the second flow subchannels, and/or the third flow subchannels, except for the cross-sectional area occupied by the separation elements, is substantially identical to the respective cross-sectional area of the flow channels that are not divided by separation elements.

6. The climate control system according to claim 1, wherein individual positions of the first, second and third flap elements are predefined based on a control curve, which predefines positions of the first, second and third flap elements as a function of a predefinable target temperature at a specific outflow opening.

7. The climate control system according to claim 1, wherein the kinematic coupling between the first flap element and the second flap element or between the first flap element, the second flap element, and the third flap element is produced by lever elements and/or joints and/or gears.

8. The climate control system according to claim 1, wherein, in a first position of the flap elements, the first flow channel is completely opened by the first flap element, the second flow channel is completely closed by the second flap element, and the third flow channel is completely opened by the third flap element.

9. The climate control system according to claim 8, wherein, in a second position of the flap elements, the first flow channel is completely closed by the first flap element, the second flow channel is completely opened by the second flap element, and the third flow channel is completely closed by the third flap element.

10. The climate control system according to claim 9, wherein, in a third position of the flap elements, the first flow channel is partially opened by the first flap element and the second flow channel is partially opened by the second flap element, and the third flow channel is completely closed by the third flap element.

11. A method for air tempering via a climate control system according to claim 1, wherein the third flap element is completely closed until the temperature falls below a defined target temperature of the air at an outflow opening, wherein the third flap element starts to rotate open when the air at the outflow opening falls below the defined target temperature and increasingly opens the third flow channel to the outflow opening until the third flow channel is completely opened, such that a defined minimum target temperature of the air is provided at the outflow opening.

12. The climate control system according to claim 1, wherein the third flap element in the third flow channel is adjustable independently from the first flap element and the second flap element by a further control device.

13. The climate control system according to claim 1, wherein when the third flap element is in a partially open position or a fully open position, the second flap element remains in a fully closed position.

* * * * *